United States Statutory Invention Registration [19]

[11] Reg. Number: H479

Wood et al.

[43] Published: Jun. 7, 1988

[54] WOOD PULP BLEACHING PROCESS

[75] Inventors: Donald L. Wood; Eugene F. Lutz, both of Houston, Tex.

[73] Assignee: Shell Oil Company, Houston, Tex.

[21] Appl. No.: 943,355

[22] Filed: Dec. 19, 1986

[51] Int. Cl.[4] ..... D06L 3/02

[52] U.S. Cl. ..... 8/111; 162/78; 252/186.41

[58] Field of Search ..... 252/186.41; 162/78; 8/111

[56] References Cited

U.S. PATENT DOCUMENTS 3,462,344 8/1969 Kindron ..... 162/78

FOREIGN PATENT DOCUMENTS 0710629 1/1972 Netherlands .

*Primary Examiner*—John F. Terapane
*Assistant Examiner*—Susan Wolffe

[57] ABSTRACT

An improvement upon processes for the bleaching of wood pulp which comprise preparing an aqueous alkaline bleaching medium containing hydrogen peroxide and contacting the pulp with said medium under agitation. The improvement particularly comprises agitating a suspension of the pulp in an aqueous medium containing the hydrogen peroxide and between about 15 and 65 percent by mol of one or more of a limited class of alkenylsuccinic anhydride compounds which are found to promote the bleaching of the wood pulp by the hydrogen peroxide. The improved process of the invention is further found to be necessarily restricted to operation under limited conditions of bleaching mixture temperature and pH.

The invention is usefully applied in the preparation of a wide variety of paper and paperboard products. The invention has particular benefit in accomplishing a high degree of bleaching performance at relatively low bleaching system temperatures.

1 Claim, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

WOOD PULP BLEACHING PROCESS

BACKGROUND OF THE INVENTION

The present invention relates to the processing of wood pulp, and particularly to improvement in the bleaching of wood pulp by hydrogen peroxide.

It is common practice in the pulp and paper industry to treat wood pulp to improve its color and brightness. To a large extent, pulp color and brightness determines its usefulness and value. Considerations of visual appeal now apply not only to fine paper and printing products of the pulp and paper industry, but extend to packaging papers and boards, newsprint, and the like.

In the bleaching process, the pulp is contacted with any of several common bleaching agents, for example chlorine dioxide, a hypochlorite compound, or hydrogen peroxide.

The present invention particularly relates to an improvement in the bleaching of pulp with hydrogen peroxide. Although the potential for use of hydrogen peroxide in wood pulp bleaching is well known in the art, hydrogen peroxide bleaching has in the past found relatively limited use in actual practice. Today, however, interest in hydrogen peroxide wood pulp bleaching is increasing for a variety of reasons. For instance, there is increased emphasis today in the processing of pulp by thermal and mechanical rather than chemical means. Thermal and mechanical processing often provides economies in operation and a stronger paper product. However, thermal and mechanical processing yields a product which has a higher content of lignin, unsaturated fatty material, and other substances responsible for color formation in paper products prepared from the pulp. As a result, a more severe bleaching is required of the thermal/mechanical pulp than of a corresponding chemical pulp to achieve the desired color and brightness. Under these conditions hydrogen peroxide is generally effective in significantly lower quantity, compared to the use of chlorine bleaches.

There is now also an increased interest in the production of alkaline papers, for reasons relating to convenience and cost in the paper making process and to strength and life of the finished paper. Hydrogen peroxide is known to be very useful and effective under alkaline conditions.

It has further been reported that hydrogen peroxide improves ink particle dispersion when bleaching takes place in combination with the deinking of printed papers, reduces brightness reversion in paper products prepared from bleached pulp, enhances drainage characteristics of the pulp fibers during papermaking, and attacks cellulose fibers to a lesser extent than do chlorine bleaches.

The object of this invention is an improvement in the performance of processes for the hydrogen peroxide bleaching of wood pulp. In one important aspect, the present invention is directed to a process in which an alkenylsuccinic anhydride compound is incorporated into the aqueous pulp bleaching medium as a promoter for the bleaching activity. It is known in the art, from the disclosure of the published German patent application No. 3,247,061, to incorporate into a peroxide-containing bath for the bleaching of cellulose fiber materials (e.g., cotton) a mixture of phosphoric acid with an alkylcarboxylic anhydride in which the alkyl group has 2 to 4 carbon atoms and is preferably acetic anhydride. Netherlands patent application No. 7109629 has been reported to describe a powdered laundry washing composition containing anionic, nonionic or soap washing agents, builders, an oxygen-liberating bleaching agent such as sodium perborate, and an alkenyl- or alkylsuccinic anhydride bleach activator wherein the alkenyl or alkyl group has from 6 to 12 carbon atoms. Japanese patent application No. 57029662, discloses the hydrogen peroxide bleaching of cloth or yarn at low pH (e.g., 4 to 7) and at high temperature (e.g., 50° to 120° C.) in the presence of an acid anhydride such as acetic anhydride, succinic anhydride, or phthalic anhydride. It is further in the art (i.e., from disclosures in German patent application No. 3438529 and European patent application No. 179223) that alkyl- and aryl-substituted diperoxysuccinic acids, having utility as bleaches and bleach boosters, are prepared by reacting a 2-alkyl- or aryl-substituted succinic anhydride, wherein the alkyl or aryl group has from 4 to 20 carbon atoms, with a mixture of hydrogen peroxide, water, and sulfuric acid.

SUMMARY OF THE INVENTION

It has now been found that the performance of hydrogen peroxide in the bleaching of wood pulps is enhanced by the presence in the aqueous bleach solution, during its contact with pulp, of an alkenylsuccinic anhydride compound. The invention is viewed as an improvement upon conventional hydrogen peroxide pulp bleaching processes, which is attributable to the added alkenylsuccinic anhydride in the bleach and pulp mixture.

Only a very limited class of alkenylsuccinic anhydride compounds are acceptable for use in the invention. It has been found to be of critical importance to the invention that the alkenylsuccinic anhydride additive be one or more compounds in which the alkenyl moiety of the molecule is selected from the group consisting of branched carbon chain alkenyl groups having between 8 and 12 carbon atoms, inclusive, and straight carbon chain alkenyl groups having between 8 and 11 carbon atoms, inclusive.

The process of the invention is readily adapted to use in conventional hydrogen peroxide bleaching facilities and operations. It has been found, however, that the performance of the invention is further critically dependent upon the use of a bleaching step temperature between about 30° and 55° C. From this standpoint, the invention has particular advantage in its ability to provide a high level of bleaching performance at relatively low temperature. The practice of the invention thus affords not only an advantage in bleaching performance but also an opportunity for substantial saving in process energy utilization. The invention is further characterized by restrictions upon the relative proportions of wood pulp, hydrogen peroxide, and alkenylsuccinic anhydride promoter components of the bleaching mixture, and upon the mixture's alkalinity.

Thus, the present invention can be described in summary as an improvement upon a process for the bleaching of wood pulp which comprises contacting a mixture of the pulp and an aqueous alkaline bleaching medium containing hydrogen peroxide. The improvement specifically comprises agitating at a temperature between about 30° and 55° C. a mixture containing (i) between about 1 and 30 percent by weight of the wood pulp, calculated on the total weight of the aqueous medium and the pulp, suspended in (ii) an aqueous medium having a pH between about 9.0 and 12 and comprising between about 0.1 and 10 percent by weight of hydrogen peroxide, calculated on the weight of the wood pulp, and between about 15 and 65 percent by mol, calculated on mols of hydrogen peroxide, of a beaching promoter consisting of one or more alkenylsuccinic anhydride compounds wherein the alkenyl moiety of the molecule is selected from the group consisting of branched carbon chain alkenyl groups having between 8 and 12 carbon atoms, inclusive, and straight carbon chain alkenyl groups having between 8 and 11 carbon atoms, inclusive.

DESCRIPTION OF THE PREFERRED EMBODIMENTS

The present invention centers upon the addition to the hydrogen peroxide pulp bleaching process of a particularly specified alkenylsuccinic anhydride ("ASA") bleaching promoter, and upon critical requirements for the relative proportions of the bleaching system components and the bleaching system temperature and pH. In other respects, the invention is broadly applicable to hydrogen peroxide bleaching carried out under procedures and conditions as are known in the art for pulp processing.

Pulp bleaching with hydrogen peroxide, both as it is known in the art and as it is practiced in this invention, involves the agitation of a suspension of the pulp fibers in an aqueous medium containing the peroxide. The quantity of pulp fiber present in this suspension is not narrowly critical and the consistency of the mixture may vary over a significant range, for example, from about 1 to 30%. Consistency is a term which is used to quantify the amount of pulp in the total suspension, and is calculated as the weight percent of pulp fiber (on a dry basis) relative to the total weight of the suspension, i.e., the weight of the mixture of the pulp and the aqueous medium. Hydrogen peroxide bleaching is most commonly applied to pulp suspensions having a 3 to 20% consistency, and the invention is preferably practiced within this range.

Pulp from a wide range of sources is suitably subjected to hydrogen peroxide bleaching, and the source of the pulp is not critical to the invention. The pulp is very suitably either a virgin pulp or a pulp generated from recycled paper or board products, for example, newsprint. The feedstock is pulped, i.e., substantially reduced to individual fibers by mechanical and/or chemical means, before contact with the peroxide solution. In particularly preferred embodiments, the invention is applied to the bleaching of mechanical pulps. The pulp is often subjected to other processing steps before and/or after bleaching, depending in large part upon the source of the fiber and its intended end use. For example, pulp from printed recycle stock is typically treated for ink removal prior to bleaching.

Hydrogen peroxide is typically present in the aqueous bleaching mixture in an amount from about 0.1 to 10 percent by weight (% w), based on the dry weight of the pulp fibers present. Bleaching with between about 0.2 and 5% w hydrogen peroxide is considered preferred for most applications. As a rule, the bleaching performance increases with increased quantities of hydrogen peroxide. Hydrogen peroxide is usually added to the pulp suspension, or to the aqueous phase prior to introduction of the pulp, as a concentrated aqueous solution, e.g., a 30 to 70% solution.

Hydrogen peroxide bleaching is, in all cases of interest to this invention, conducted in an alkaline medium, preferably one having a pH in the range from about 9.0 to 12.0, and most preferably one having a pH in the range from about 9.5 to 11.0. An alkali, for instance, sodium hydroxide or sodium carbonate, is added to the aqueous medium for pH adjustment. All or part of the alkalinity is often provided by addition of sodium silicate, which also serves to stabilize the hydrogen peroxide. Sodium silicate is typically applied in quantities up to about 2% w, based on dry weight of the pulp. Other optional ingredients of the hydrogen peroxide bleaching solution include other known bleaching agents, e.g., chlorine or hypochlorite bleaches and/or other peroxide stabilizers, e.g., magnesium sulfate and sequestering agents such as phosphate compounds, the pentasodium salt of diethylenetriamine pentaacetic acid and diethylenetriamine pentamethylene phosphonic acid.

Methods and equipment are known for hydrogen peroxide bleaching of pulp in either a batch or continuous process step. The duration of the bleach contact with the pulp is recognized to be a function of temperature, pulp consistency, alkalinity, peroxide content, and desired product brightness, and is generally between about 0.5 to 5 hours, particularly between about 0.5 to 3 hours.

For the purposes of the process improvement of this invention, the mixture of pulp and aqueous hydrogen peroxide bleaching medium additionally contains one or more of a class of alkenylsuccinic anhydride ("ASA") compounds which have been found to promote the bleaching action of the peroxide.

In one critical respect, suitable alkenylsuccinic anhydride compounds are found to have a necessarily limited range of carbon atoms in the alkenyl moiety of the molecule. The structure of the alkenyl group carbon chain, i.e., whether it is of straight or branched chain structure, also has an influence upon its performance in the invention. Suitable alkenylsuccinic anhydride compounds are selected from the group consisting of those wherein the alkenyl moiety has a branched carbon chain and a carbon number in the range from 8 to 12, inclusive, and those wherein the alkenyl moiety has a linear carbon structure and a carbon number in the range from 8 to 11, inclusive. ASA compounds in which the alkenyl moieties have carbon numbers outside of these specified ranges have been found to offer no enhancement of the peroxide bleaching performance. Bleaching promoters selected from the group consisting of alkenylsuccinic anhydrides wherein the alkenyl moiety is either linear or branched and has a carbon number in the range from 8 to 10, inclusive, are considered preferred for use in this invention. The use of n-octenylsuccinic anhydride is considered most preferred.

The ASA compounds suitable for use in the invention are well known in the chemical arts and commercially available from a variety of sources. They may be formed by the addition reaction of maleic anhydride with mono-olefins. Reaction with a $C_8$ to $C_{11}$ linear alpha-olefin will yield an alkenylsuccinic anhydride having a linear $C_8$ to $C_{11}$ alkenyl moiety, while reaction with a $C_8$ to $C_{12}$ branched alpha-olefin or linear or branched internal olefin will yield an alkenylsuccinic anhydride having a branched $C_8$ to $C_{12}$ alkenyl moiety. The reaction of maleic anhydride with such olefins is known to occur thermally, for instance, at temperatures above about 100° C.

The ASA promoter is suitably introduced into the aqueous bleaching medium prior to, at the same time as, or after the addition of the hydrogen peroxide, and suitably either prior to or after the introduction of pulp into the medium. The ASA is, however, necessarily present in the hydrogen peroxide containing bleaching medium during at least a significant portion of the time over which the medium is in contact with the pulp fiber.

It is particularly preferred in practice to add the hydrogen peroxide and the ASA independently to the pulp containing aqueous mixture. By independent addition, it is meant that contact of the hydrogen peroxide and the ASA is brought about substantially simultaneously with the contact of their combination with the wood pulp. In this respect, it is most preferred to introduce the hydrogen peroxide and the ASA individually into an aqueous medium containing the pulp. For example, it is very convenient to simultaneously introduce hydrogen peroxide and ASA into an aqueous alkaline pulp containing mixture, or to introduce ASA into an alkaline aqueous mixture containing pulp and hydrogen peroxide. Less preferred, but also very suitable is the addition of hydrogen peroxide to an alkaline aqueous mixture containing pulp and ASA. Alternatively, a mixture of the hydrogen peroxide and the ASA can be preformed provided that the mixture is then substantially without delay introduced into the aqueous mixture and into contact with the pulp. Extended contact between the hydrogen peroxide and the ASA prior to bleaching contact with pulp under the conditions specified for this invention increases the potential for loss of active bleaching through the formation and decomposition of unstable peroxy acid compounds.

It is also suitable in the practice of the invention to introduce into the bleaching mixture additional quantities of one or more of the peroxide and ASA bleaching components during the course of the bleaching process, for instance to adjust their concentrations and relative proportions to desired levels.

The ASA promoter is necessarily present in the hydrogen peroxide bleaching step for purposes of this invention in a quantity such that the aqueous medium contains between about 15 and 65 percent by mol of the ASA, calculated on mols of hydrogen peroxide present. Preferably, the ASA promoter is present in an amount between about 30 and 65 mol percent, relative to the hydrogen peroxide. A ratio of about 2 mols of hydrogen peroxide to 1 mol of ASA, corresponding to about 50 mol percent of ASA relative to hydrogen peroxide, is considered most preferred.

Although conventional peroxide bleaching processes are carried out over a broad temperature range, e.g., from about 20° to greater than 100° C., the bleaching step of the process of the invention is critically limited to practice only over the very restricted temperature range from about 30° to 55° C. The ASA functions to promote the performance of the hydrogen peroxide only at temperatures within this limited range. At both higher and lower temperatures, the ASA is not found to add any appreciable benefit to bleaching performance, compared to the performance of the hydrogen peroxide alone. A bleaching step temperature in the range from about 35° to 55° C. is preferred for practice of the invention, while a temperature in the range from about 40° to 50° C. is considered to be more preferred and a temperature in the range from about 40°-45° C. to be most preferred.

In practice, the invention provides a level of bleaching performance at relatively low temperature which was attainable in conventional practice only at much higher process temperature. In this regard, the practice of the invention affords an opportunity for substantial savings in the process heat and energy requirements.

Without intending to limit the invention to one theory or mechanism of operation, it can be said that the polar carboxylate group of the alkenylsuccinic anhydride molecule is believed to facilitate the transport of the active peroxide from the liquid solution to the surface of the solid pulp fiber. It is further believed such transport from liquid to solid surface is strongly influenced by the size, e.g., carbon number, of the nonpolar hydrophobic alkenyl moiety of the molecule.

The invention will now be further described by reference to the following experimental examples, which illustrate certain preferred practices under the invention but are not intended to be interpreted to limit its broader scope. Comparative experiments are also described to illustrate the critical influence of several aspects of the invention upon its performance.

In each of the examples, the process of the invention was applied to the bleaching of a newsprint paper pulp.

For examples 1-4 and comparative experiments A-E, the invention was applied in an overall process which included steps for pulping, deinking and bleaching of printed newspaper. A fresh supply of local newspaper was shredded by hand and mixed well. Sufficient tap water was added to 20 grams of the shredded paper to bring the total volume to 0.4 liters. The paper in the mixture was then disintegrated by blending for ten seconds in a commercial one-liter blender. To this mixture was then added sodium metasilicate in a quantity of 2.5% w (based on dry paper) and 1% w of a surfactant deinking agent (based on dry paper). The deinking agent was an alkanol ethoxylate mixture resulting from the reaction of a mixture of $C_{12}$ to $C_{15}$ predominantly linear and primary alkanols with an average of about 9 mols of ethylene oxide per mol of alkanol. Deinking was carried out for thirty minutes with agitation at 43° C. The pulp consistency of this agitated mixture was 5% w. After contact with the deinking solution, the pulp was drained and washed three times on ASTM no. 20 sieves. Brightness of the deinked pulp was 50%. All reported pulp brightness values were measured with a General Electric Company Brightness Meter on handsheets made by Technical Association of the Pulp and Paper Industry Method T205 om-81. (Handsheet preparation followed the same experimental procedures described in U.S. Pat. No. 4,618,400, the relevant teachings of which are incorporated herein by this reference.)

For the bleaching step in examples 1-4 and experiments A-E, the washed pulp was mixed with tap water to a consistency of 5% w. Sodium hydroxide, in a quantity of 2% w (based on dry paper), and sodium metasilicate, in a quantity of 4% w (based on dry paper), were also added to the aqueous bleaching medium, together with hydrogen peroxide (added in an aqueous solution of 30% w concentration) in a quantity of 2% w hydrogen peroxide based on dry paper. In the examples according to the invention, an alkenylsuccinic anhydride (ASA) was also added to the bleaching medium in a quantity such that the molar ratio of hydrogen peroxide to ASA was 2 to 1. ASA was not added in the comparative experiments. The resulting bleaching mixtures had a pH of about 10 to 11. The bleaching medium was agitated for one hour at a preselected temperature. Sodium bisulfite was then added, in a quantity sufficient to lower pH to about 5.5 to destroy remaining $H_2O_2$. The bleached pulp was then formed into handsheets and brightness measurements were made.

For each of the examples and comparative experiments, the reported pulp brightness value represents the average obtained for at least three runs under identical conditions.

EXAMPLES 1 and 2 and COMPARATIVE EXPERIMENT A

A series of two examples of the invention and one comparative bleaching experiment (carried out in the absence of the ASA promoter) were conducted at a bleaching step temperature of 40° C.

Samples of a first batch of newspaper were pulped, and the pulp deinked and bleached following the above-recited procedures. As the ASA bleaching promoter, example 1 employed a n-octenylsuccinic anhydride and example 2 employed a branched dodecenylsuccinic anhydride. Brightness of the deinked pulp, prior to any bleaching was measured to be 50%. Following bleaching according to the process of the invention, at the 40° C. temperature, the bleached pulp from example 1 exhibited a brightness of 59.3% and that from example 2 a brightness of 58.0%. In both examples, the presence of the alkenyl succinic anhydride substantially enhanced the effectiveness of the bleaching step. The comparative experiment A, conducted under the same procedures but without the alkenylsuccinic anhydride promoter, yielded a pulp exhibiting a brightness of only 55.9%.

EXAMPLES 3 and 4 and COMPARATIVE EXPERIMENT B

The general procedures for pulping, deinking and bleaching were again followed, with the bleaching step taking place at a temperature of 50° C.

Samples of the first batch of newspaper were treated according to the invention in example 3, using a n-octenylsuccinic anhydride bleaching agent, and in example 4, using a branched dodecenylsuccinic anhydride bleaching agent. Comparative experiment B was conducted without an alkenylsuccinic anhydride agent, and thus was not in accordance with the invention.

The bleached pulp from the comparative experiment exhibited a brightness of 58.0%. Brightness values were increased to 59.0% by the presence of the dodecenylsuccinic anhydride in example 4 and to 59.5% by the presence of n-octenylsuccinic anhydride in example 3.

COMPARATIVE EXPERIMENTS C, D AND E

These comparative experiments illustrate the importance to the performance of the ASA in the invention of the specification for a bleaching step temperature no greater than about 55° C. Comparative experiments C, D, and E were carried out at a temperature of 60° C., and thus not in accordance with the invention.

In comparative experiment C, conducted without an alkenylsuccinic anhydride bleaching promoter, the hydrogen peroxide bleaching resulted in a pulp brightness of 59.0%. The addition of n-octenylsuccinic anhydride (2 mols hydrogen peroxide per mol of ASA) in experiment D failed to enhance the peroxide bleaching performance at the 60° C. temperature, resulting in a brightness of only 58.9%. Similarly, the presence of branched dodecenylsuccinic anhydride (2 mols hydrogen peroxide per mol of ASA) in experiment E did not promote the bleaching and resulted in a brightness value of 59.0%.

The results of examples 1–4 and of comparative examples A–E are summarized in Table 1.

TABLE 1

| example or comparative experiment | bleaching additive | bleaching temperature (°C.) | brightness % |
|---|---|---|---|
| A | none | 40 | 55.9 |
| 1 | n-$C_8$ ASA (a) | 40 | 59.3 |
| 2 | b-$C_{12}$ ASA | 40 | 58.0 |
| B | none | 50 | 58.0 |
| 3 | n-$C_8$ ASA | 50 | 59.5 |
| 4 | b-$C_{12}$ ASA | 50 | 59.0 |
| C | none | 60 | 59.0 |
| D | n-$C_8$ ASA | 60 | 58.9 |
| E | b-$C_{12}$ ASA | 60 | 59.0 |

(a) n-$C_8$ ASA represents n-octenylsuccinic anhydride
(b) b-$C_{12}$ ASA represents branched dodecenylsuccinic anhydride In examples 5–7 and comparative experiments F–H, the invention was applied to the bleaching of a pulp prepared from uninked newsprint paper. A fresh supply of the uninked paper was shredded by hand, and sufficient tap water was added to 20 grams of the shredded paper to bring the total volume to 0.4 liters. The paper in the mixture was then disintegrated by blending for ten seconds in a commercial one-liter blender. The pulp was drained and washed three times on ASTM No. 20 sieves. Brightness of handsheets prepared from the uninked pulp was measured to be 50%.

The bleaching step in examples 5 and 6 and experiments F and G was conducted in the same manner as that of examples 1–4 and experiments A–E. For example 7 and comparative experiment H, the same procedures were followed except that sodium hydroxide was not added to the bleaching medium, and the medium had a pH of about 9.5 to 10.

EXAMPLE 5 AND COMPARATIVE EXPERIMENT F

One example of the invention and one comparative bleaching experiment were carried out for a pulp prepared from a first batch of uninked newsprint. Temperature in each case was 40° C.

Initial brightness of the unbleached pulp was 52.9%. In comparative experiment F, hydrogen peroxide bleaching in the absence of an ASA promoter resulted in a pulp brightness of 57.5%. Example 5 was conducted in the presence of 2 mols hydrogen peroxide per mol of n-octenylsuccinic anhydride, with a resulting enhancement in pulp brightness to a value of 61.4%.

EXAMPLE 6 AND COMPARATIVE EXPERIMENT G

An example of the invention and a comparative experiment were applied at a temperature of 50° C. to the bleaching of a pulp prepared from a second batch of uninked newsprint.

Initial brightness of this pulp was 51.9%. Bleaching of the pulp in the absence of promoter in the comparative experiment resulted in a brightness of 57.3%. In example 6, bleaching in the presence of one mol of n-octenylsuccinic anhydride (one mol per 2 mols of hydrogen peroxide) yielded an increase in pulp brightness to 59.4%.

EXAMPLE 7 AND COMPARATIVE EXPERIMENT H

An example of the invention and a comparative experiment were applied at a temperature of 40° C. to the bleaching of a pulp prepared from a batch of uninked newsprint and having an initial brightness of 55.3%.

Bleaching of the pulp in the absence of promoter in the comparative experiment resulted in a paper brightness of 58.9%. In example 7, bleaching in the presence of n-octenylsuccinic anhydride (one mol per 2 mols of hydrogen peroxide) yielded an enhanced level of pulp brightness of 63.7%.

The results of examples 5–7 and of comparative examples F–H are summarized in Table 2.

TABLE 2

| example or comparative experiment | bleaching additive | bleaching temperature (°C.) | brightness % |
|---|---|---|---|
| F | none | 40 | 57.5 |
| 5 | n-$C_8$ ASA (a) | 40 | 61.4 |
| G | none | 50 | 57.3 |
| 6 | n-$C_8$ ASA | 50 | 59.4 |
| H | none | 50 | 58.9 |
| 7 | n-$C_8$ ASA | 50 | 63.7 |

(a) n-$C_8$ ASA represents n-octenylsuccinic anhydride

For examples 8 and 9 and comparative experiments I–L, the invention was applied in a process which included steps for pulping, deinking and bleaching of printed newspaper, generally according to the procedures described above for examples 1–4 and comparative examples A–E. (The paper consistency of the deinking medium was 3% instead of 5%.) Each of the examples 8 and 9 and comparative experiments I–L was carried out at 50° C.

EXAMPLES 8 AND 9 AND COMPARATIVE EXPERIMENT I

Two examples and one comparative experiment were applied to the bleaching of a pulp prepared from a batch of printed newspaper which had first been deinked. Brightness of the deinked pulp before bleaching was 47.1%.

Bleaching of the pulp in the absence of promoter in the comparative experiment resulted in a brightness of 53.7%. In example 8, bleaching in the presence of n-octenylsuccinic anhydride (one mol per 2 mols of hydrogen peroxide) yielded an increase in pulp brightness to 56.4%. In example 9, bleaching in the presence of branched dodecenylsuccinic anhydride (one mol per 2 mols of hydrogen peroxide) yielded an increase in pulp brightness to 56.3%.

COMPARATIVE EXPERIMENTS J–L

Comparative experiments J–L were carried out on pulp prepared from the same batch of newsprint as that used in examples 8 and 9 and comparative experiment I.

These examples illustrate the unsuitability for use as a bleaching promoter in the invention of succinic anhydride compounds other than those specified.

In comparative experiment J, the pulp was bleached in the presence of succinic anhydride (one mol succinic anhydride per 2 mols of hydrogen peroxide). The resulting pulp exhibited a brightness of only 53.8%, demonstrating that succinic anhydride does not provide meaningful enhancement of the performance of the hydrogen peroxide bleaching step.

In comparative experiment K, the pulp was bleached in the presence of n-dodecenylsuccinic anhydride (one mol per 2 mols of peroxide). Brightness of the resulting pulp was only 51.0%, indicating that this additive had no positive affect on the performance of the peroxide bleaching.

In comparative experiment L, the pulp was bleached in the presence of n-hexadecenylsuccinic anhydride (one mol per 2 mols of peroxide). Brightness of the resulting pulp was 53.6%.

The results of examples 8 and 9 and of comparative examples I–L are summarized in Table 3.

TABLE 3

| example or comparative experiment | bleaching additive | bleaching temperature (°C.) | brightness % |
|---|---|---|---|
| I | none | 50 | 53.7 |
| 8 | n-$C_8$ ASA (a) | 50 | 56.4 |
| 9 | b-$C_{12}$ ASA (b) | 50 | 56.3 |
| J | succinic anhydride | 50 | 53.8 |
| K | n-$C_{12}$ ASA (c) | 50 | 51.0 |
| L | n-$C_{16}$ ASA (d) | 50 | 53.6 |

(a) n-$C_8$ ASA represents n-octenylsuccinic anhydride
(b) b-$C_{12}$ ASA represents branched dodecenylsuccinic anhydride
(c) n-$C_{12}$ ASA represents n-dodecenylsuccinic anhydride
(d) n-$C_{16}$ ASA represents n-hexadecenylsuccinic anhydride The failure of the succinic anhydride to promote hydrogen peroxide bleaching demonstrates that the enhanced bleaching in the invention is not merely the result of the formation of a peroxyacid which functions as the active bleaching agent.

We claim as our invention:

1. In a process for the bleaching of wood pulp which comprises steps for preparing an aqueous alkaline bleaching medium containing hydrogen peroxide and contacting the pulp with said medium under agitation, the improvement which comprises agitating at a temperature between about 30° and 55° C. a mixture containing (i) between about 1 and 30 percent by weight of the wood pulp, calculated on the total weight of the aqueous medium and the pulp, suspended in (ii) an aqueous medium having a pH between about 9.0 and 12 and comprising between about 0.1 and 10 percent by weight of hydrogen peroxide, calculated on the weight of the wood pulp, and between about 15 and 65 percent by mol, calculated on mols of hydrogen peroxide, of a bleaching promoter consisting of one or more alkenylsuccinic anhydride compounds wherein the alkenyl moiety of the molecule is selected from the group consisting of branched carbon chain alkenyl groups having between 8 and 12 carbon atoms, inclusive, and straight carbon chain alkenyl groups having between 8 and 11 carbon atoms, inclusive.

* * * * *